United States Patent
Arnold et al.

(10) Patent No.: US 7,366,205 B2
(45) Date of Patent: Apr. 29, 2008

(54) METHOD FOR SYNCHRONIZING NODES OF A COMMUNICATIONS SYSTEM

(75) Inventors: Johann Arnold, Wendelstein (DE); Dieter Brückner, Unterleiterbach (DE); Michael Franke, Erlangen-Dechsendorf (DE); Franz-Josef Götz, Heideck (DE)

(73) Assignee: Siemens Aktiengesellschaft, Munich (DE)

(*) Notice: Subject to any disclaimer, the term of this patent is extended or adjusted under 35 U.S.C. 154(b) by 773 days.

(21) Appl. No.: 10/490,525

(22) PCT Filed: Sep. 20, 2002

(86) PCT No.: PCT/DE02/03432

§ 371 (c)(1),
(2), (4) Date: Mar. 23, 2004

(87) PCT Pub. No.: WO03/028258

PCT Pub. Date: Apr. 3, 2003

(65) Prior Publication Data

US 2004/0258097 A1 Dec. 23, 2004

(30) Foreign Application Priority Data

Sep. 26, 2001 (DE) ............................. 101 47 433
Jun. 28, 2002 (DE) ............................. 102 29 110

(51) Int. Cl.
*H04J 3/06* (2006.01)
(52) U.S. Cl. .................................... 370/503
(58) Field of Classification Search ............ 370/350, 370/503, 509, 510, 512
See application file for complete search history.

(56) References Cited

U.S. PATENT DOCUMENTS

| 4,982,185 | A | * | 1/1991 | Holmberg et al. ....... 340/825.21 |
| 5,333,299 | A | * | 7/1994 | Koval et al. ................. 713/400 |
| 5,408,506 | A | | 4/1995 | Mincher et al. |
| 5,537,549 | A | * | 7/1996 | Gee et al. ..................... 709/224 |
| 5,566,180 | A | * | 10/1996 | Eidson et al. ................ 370/473 |
| 5,828,670 | A | * | 10/1998 | Narasimha et al. .......... 370/516 |
| 5,990,638 | A | * | 11/1999 | Aoyama et al. ............... 318/85 |
| 6,914,914 | B1 | * | 7/2005 | Flood et al. ................. 370/503 |
| 2001/0005361 | A1 | * | 6/2001 | Lipsanen ..................... 370/238 |

FOREIGN PATENT DOCUMENTS

| DE | 42 15 380 A1 | 11/1993 |
| DE | 197 51 302 A1 | 5/1998 |
| DE | 197 03 963 A1 | 8/1998 |
| DE | 199 17 354 A1 | 10/2000 |
| DE | 199 43 779 A1 | 3/2001 |
| EP | 0 991 216 A2 | 4/2000 |

* cited by examiner

*Primary Examiner*—Kwang Bin Yao
*Assistant Examiner*—Andrew Lai

(57) ABSTRACT

The invention relates to a method for synchronizing nodes of a communication system comprising the following steps: receipt of a first synchronization message by a first node, whereby the first synchronization message contains a desired receipt time by a first node; correction of a time base of the first node, based on a deviation between an actual receipt time, determined as a result of the base time, and the desired receipt time.

14 Claims, 4 Drawing Sheets

$t_0 :=$ Send time of synchronization telegram at the clock master $\Delta t_L :=$ Transmission propagation time $\Delta t_{n \to m} :=$ Residence time in the network node n + transmission propagation time from n to m

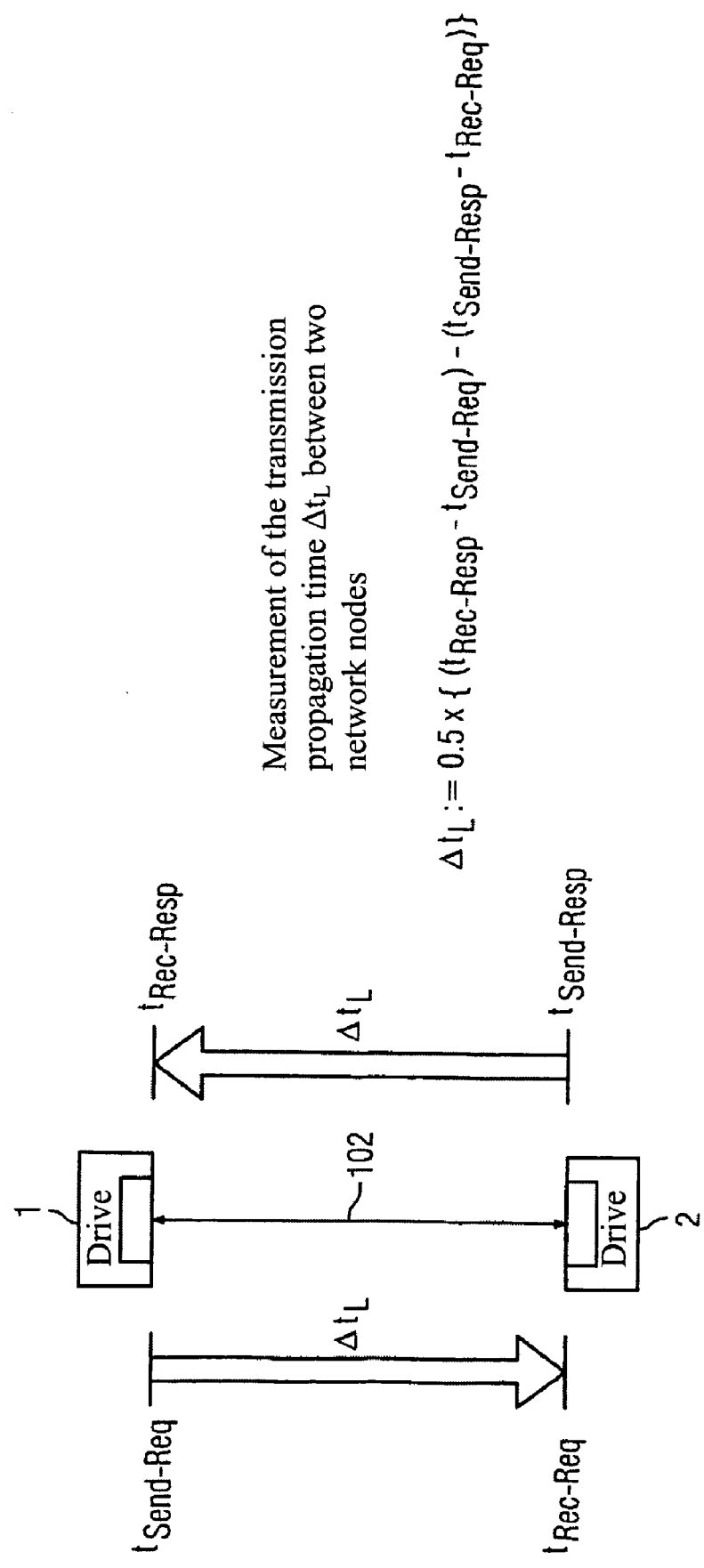

METHOD FOR SYNCHRONIZING NODES OF A COMMUNICATIONS SYSTEM

CROSS REFERENCE TO RELATED APPLICATIONS

This application is the US National Stage of International Application No. PCT/DE02/03432, filed Sep. 20, 2002 and claims the benefit thereof. The International Application claims the benefits of German application No. 10147433.4 DE filed Sep. 26, 2001, and of German application No. 10229110.1 filed Jun. 28, 2002, both of the applications are incorporated by reference herein in their entirety.

FIELD OF INVENTION

The invention relates to a method for synchronizing nodes of a communication system, in particular of an automation system, as well as a to clock master and a node of the communication system.

BACKGROUND OF INVENTION

A method for synchronizing local timing generators of an automation system is known from DE 4215 380 A1. With this method a local timing generator is synchronized by means of time information which is derived from the time information of a central timing generator plus a correction value corresponding to the transmission and processing time. The time information is transmitted by a transmission unit associated with the central timing generator only if it deviates from the current time by less than a predetermined amount.

DE 199 173 54 A1 discloses a synchronization method for a master unit and at least one slave unit with internal timing generators that are to be synchronized with one another. With this method time signals are transmitted by the master unit to the slave unit via two communication paths, which signals require propagation times on the two communication paths to the slave unit. The difference in the propagation times of the time signals is recorded. The timing generators are then synchronized taking the propagation times into account.

DE 197 03 963 A1 discloses a method for exchanging data between electronic modules which can be arranged on a decentralized basis. With this method one module is used as a clock generator and, what is more, without a redundancy mechanism.

Various standardized communication systems, also referred to as bus systems, which support data exchange between two or more electronic modules or devices are known from the prior art, in particular also for use in automation systems. Examples of such communication systems are: Fieldbus, Profibus, Ethernet, Industrial Ethernet, FireWire, or also PC-internal bus systems (PCI). These bus systems are in each case designed or optimized for different fields of application and permit a decentralized control system to be set up. Very fast and reliable communication systems with predictable response times are required for process control and monitoring in automated production and in particular in digital drive technologies.

With parallel bus systems, such as SMP, ISA, PCI or VME for example, a very fast and simple means of communication can be set up between different modules. These known bus systems are therefore deployed in particular in computers and PCs.

Synchronous, clock-controlled communication systems with equidistance properties are known in particular from automation technology. By this is meant a system comprising at least two subscribers that are interconnected via a data network for the purpose of reciprocal exchange of data or reciprocal transmission of data. In this case the data exchange takes place cyclically in equidistant communication cycles which are predetermined by the communication clock timing used by the system. Subscribers are for example central automation devices, programming, planning or control devices, peripheral devices such as, for example, input/output modules, drives, actuators, sensors, stored program controls (SPC) or other control units, computers, or machines which exchange electronic data with other machines, and in particular process data from other machines. In the following, control units are understood to mean regulating or controlling units of any kind.

An equidistant deterministic cyclical data exchange in communication systems is based on a common clock or time base for all the components involved in the communication. The clock or time base is transmitted to the other components by a specially designated component (clock master or timer). With isochronous realtime Ethernet, the clock or time base is specified by a clock master by the sending of synchronization telegrams.

SUMMARY OF INVENTION

The object of the invention is to create an improved method for synchronizing the nodes of a communication system, as well as an improved clock master and node for such a communication system.

The object underlying the invention is achieved in each case by the features of the independent claims. Preferred embodiments of the invention are specified in the dependent claims.

The present invention enables the time bases in the nodes of an isochronous communication system to be adjusted/corrected. In a preferred embodiment of the invention the procedure for doing this is that at least one clock master generates a synchronization telegram which contains the reference receive time at a first node adjacent to the clock master. This reference receive time is determined by the clock master based on its master time base and the transmission propagation time, known to the clock master, of the synchronization telegram from the clock master to the first node.

When the synchronization telegram of the clock master is received by the node, the actual receive time is stored by the node. The actual receive time is determined on the basis of the local time base of the node.

If the local time base of the node is synchronous with the master time base of the clock master, the actual receive time and the reference receive time are identical. If the actual receive time deviates from the reference receive time, this deviation is used as a basis for correcting the local time base in the node in order to synchronize this local time base with the master time base in the clock master.

In a preferred embodiment of the invention the procedure used to synchronize the further nodes of the communication system is as follows: The node which has received the synchronization telegram from the clock master determines the reference receive time of a further synchronization telegram at a second node which is adjacent to the first node. The reference receive time at the second node is determined by the first node on the basis of the reference receive time of the synchronization telegram of the clock master, as follows: a residence time in the first node and the transmission propagation time from the first to the second node are added to the reference receive time contained in the synchronization telegram of the clock master.

The residence time is produced here from the difference between the receive time of the synchronization telegram from the clock master and the send time of the further synchronization telegram from the first node to the second node.

A similar procedure takes place in the second node, with the reference receive time of a further synchronization telegram being determined at a third node. For this purpose the residence time and the transmission propagation time from the second to the third node is again added to the reference receive time at the second node.

This synchronization of the nodes is of particular advantage for the communication diagnostic purposes in the communication system. For the certification of components and subsystems of the communication system in particular it must be possible to provide information in the application of a network node with a timestamp.

For example, an error event during the operation of the system can lead to a multiplicity of consequential errors, each of which leads to error messages in the control system. As the messages can overtake each other, conclusions about the cause of the error are only possible on the basis of the timestamp. Only the time-and-date information contained in the messages, in other words their timestamps, permits the messages to be sorted into chronological order and thereby enables an analysis of the cause to be made. For this the synchronization of the time bases according to the invention is particularly advantageous, since the synchronicity of the local time bases of the nodes is necessary as a prerequisite for chronological sorting.

Of particular advantage here above all is that a clock time with defined accuracy can be set for all the nodes in the system or the application, this time being specified by a clock master. A high degree of accuracy can be achieved here, i.e. a time difference between the local time bases of the network no des of, for example, less than 1 μs.

A further advantage is that the choice of the clock master can be recognized by the application in order, for example, to activate a redundant clock master. For this purpose a redundancy mechanism can be used as disclosed in DE 100 13 397 and in DE 10145 518.

A further advantage is to be seen in the fact that standard time mechanisms such as the Network Time Protocol (NTP) or Simple Network Time Protocol (SNTP), for example, can be integrated into the communication system.

According to a preferred embodiment of the invention, the receive time is stored for each data telegram received by a node, i.e. not only for the synchronization telegrams. An application of the node in question can then access the receive time. Similarly, the send times of all telegrams sent by a node can also be stored.

According to a further preferred embodiment of the invention, for all data telegrams sent by a node, the respective send time can be entered by the node in the data area of the data telegram.

The inventive common time base established with a high degree of accuracy for the network nodes is therefore particularly advantageous:
both for an analysis of the telegram traffic in the network, and also for synchronized actions in distributed systems in the automation technology sector.

According to a preferred embodiment of the invention, one network node is parameterized as the clock master, with all the other network nodes being required to synchronize their times to the clock master time. For this purpose the clock master periodically sends synchronization telegrams to the other network nodes.

The clock master enters the total of the following values into the data field of the synchronization telegram:
the send time of the synchronization telegram and
the transmission propagation time to the adjacent network node which receives the telegram.

Each time a telegram is received, and therefore also when a synchronization telegram is received, the network nodes store the local receive time.

The deviation of the local time from the reference time results from the time difference between the time entered in the synchronization telegram and this local receive time. This time difference can be used by a control software tool as an input variable for correcting the local time.

Each network node which forwards a synchronization telegram takes the time entered in the synchronization telegram and adds to it the total of
the local residence time:=(forwarding time−receive time) in this node and
the transmission propagation time to the adjacent network node which receives the telegram.

An important requirement for the accuracy of the time synchronization is to determine the transmission propagation times between each pair of adjacent network nodes. The transmission propagation time is preferably measured by means of the following telegram sequence:
The initiator of the propagation time measurement enters the send time $t_{Send-Req}$ into the data field of the propagation time measurement request telegram.
The receiver of this propagation time measurement request telegram stores the receive time $t_{Rec-Req}$ and sends back a propagation time measurement response telegram at time $t_{Send-Resp}$.
The following times are entered in the data field of this response telegram:
the send time $t_{Send-Req}$ of the request telegram from the initiator of the propagation time measurement
the delay time $(t_{Send-Resp}-t_{Rec-Req})$ between request and response telegram.
The initiator of the propagation time measurement stores the arrival time of the propagation time measurement response telegram $t_{Rec-Resp}$ and determines the transmission propagation time with the aid of the formula:

transmission propagation time:=$[(t_{Rec-Resp}-t_{Send-Req})-(t_{Send-Resp}-t_{Rec-Req})]/2$ In a non-redundant system a clock master periodically sends only one synchronization telegram. With redundant systems two cases should be distinguished:
A clock master periodically sends at least two synchronization telegrams on different paths to the network nodes. When performing the time synchronization, the control software of the network nodes must take into account in each case all the received synchronization telegrams.
The active clock master and a redundant clock master periodically send synchronization telegrams simultaneously, but only the synchronization telegrams of the active clock master are evaluated and used to adjust the time. Only if the redundant clock master marks its synchronization telegrams as active due to the absence of synchronization telegrams from the previously active clock master, are these used for time synchronization by the control software.

The two approaches can also be combined.

According to a preferred embodiment of the invention, standard time mechanisms such as NTP or SNTP can also be integrated. Standard time telegrams which enter a network and whose time has been synchronized according to the method described above are "packed" into the data area of a special telegram. Only these "packed" standard time telegrams are sent inside the network. Each network node which feeds a "packed" standard time telegram into the network enters the following in the data field of this telegram: the total of the send time, and the transmission propagation time to the adjacent network node which receives the telegram.

Each network node that forwards a "packed" standard time telegram takes the residence time in the network entered in the telegram and adds to it the total of the residence time in the network node:=(forwarding time−receive time), and the transmission propagation time to the adjacent network node which receives the telegram.

Before exiting the network:

the standard time telegram is "unpacked" again, and the entered standard time is corrected by the telegram propagation time in the network.

A characteristic of this method is the ability to determine the receive and send time with bit clock accuracy and to use these times for time synchronization in a network. To increase operating reliability, support is provided for redundancy in the time synchronization. Standard time mechanisms can also be integrated.

The use of the time mechanisms described is possible in particular in realtime Ethernet communication in the Fieldbus sector.

It is also particularly advantageous that the disclosed methods can be used in automation systems, in particular for and in packaging machines, presses, plastic injection molding machines, textile machines, printing machines, machine tools, robots, handling systems, woodworking machines, glass processing machines, ceramic processing machines, and hoisting machines.

BRIEF DESCRIPTION OF THE DRAWINGS

Preferred embodiments of the invention are explained in more detail below with reference to the drawings, in which:

FIG. 4 is a schematic illustrating how the transmission propagation delay between adjacent network nodes is determined.

DETAILED DESCRIPTION OF INVENTION

Figure 1:
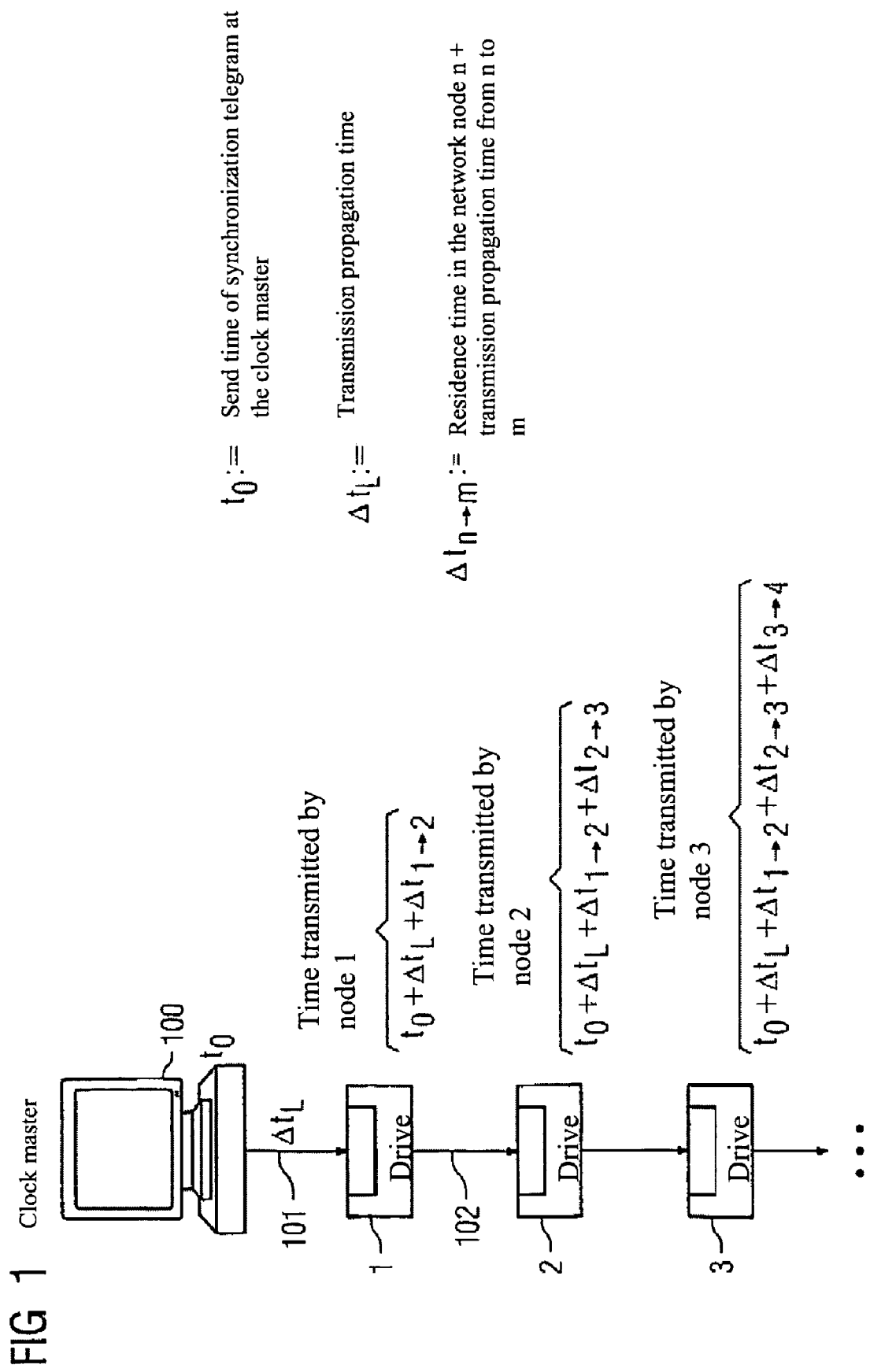
FIG. 1 is a schematic illustrating the synchronization of the nodes of a communication system based on a clock master.

The communication system shown in FIG. 1 contains a clock master 100 which is used to synchronize the local time bases in the nodes 1, 2, 3, . . . of the communication system. In the case of an automation system, the nodes 1, 2, 3, . . . can be sensors, actuators, drives or other components or subsystems.

To perform the synchronization, the clock master 100 sends a synchronization telegram to the node 1 at the send time $t_0$. The synchronization telegram contains useful data in the form of the reference receive time at the node 1, which is the product of the addition of the send time to and the transmission propagation time $\Delta t_L$ between the clock master 100 and the node 1 via the line 101. A deviation between the reference receive time and the actual receive time determined on the basis of the local time base of the node 1 is used to correct the local time base of the node 1.

Following the reception of the synchronization telegram from the clock master 100, the node 1 generates a further synchronization telegram for the node 2. This telegram is sent via the line 102 from the node 1 to the node 2. The useful data contained in the synchronization telegram sent from the node 1 to the node 2 includes the reference receive time $t_0+\Delta t_L$ which the node 1 has received from the clock master 100 plus a time period $\Delta t_{1\rightarrow 2}$, where the time $\Delta t_{1\rightarrow 2}$ is the residence time in the network node 1 plus the transmission propagation time via the line 102.

Here, the residence time is the time period between the reception of the synchronization telegram from the clock master 100 at the node 1 and the forwarding of the synchronization telegram from the node 1 to the node 2. This residence time can be determined very accurately on account of the local time base of the node 1, even if this is not yet precisely synchronized, since in this case it is not the absolute time which matters, but only the time period, in other words the relative residence time in the node, in particular node 1.

The correction of the time base in the node 2 on the basis of the synchronization telegram received by the node 1 is performed in principle in the same way as the preceding correction of the time base in the node 1. Thus, a possible deviation between the actual receive time determined on the basis of the local time base of the node 2 and the reference receive time is used as a basis for the correction in the node 2, whereby the reference receive time is contained in the useful data of the synchronization telegram received from node 1.

The node 2 adds the time $\Delta t_{2\rightarrow 3}$ to this reference receive time, in other words, to the time $t_0+\Delta t_L+\Delta t_{1\rightarrow 2}$ in order to generate a further synchronization telegram for the following node 3, etc.

Figure 2:
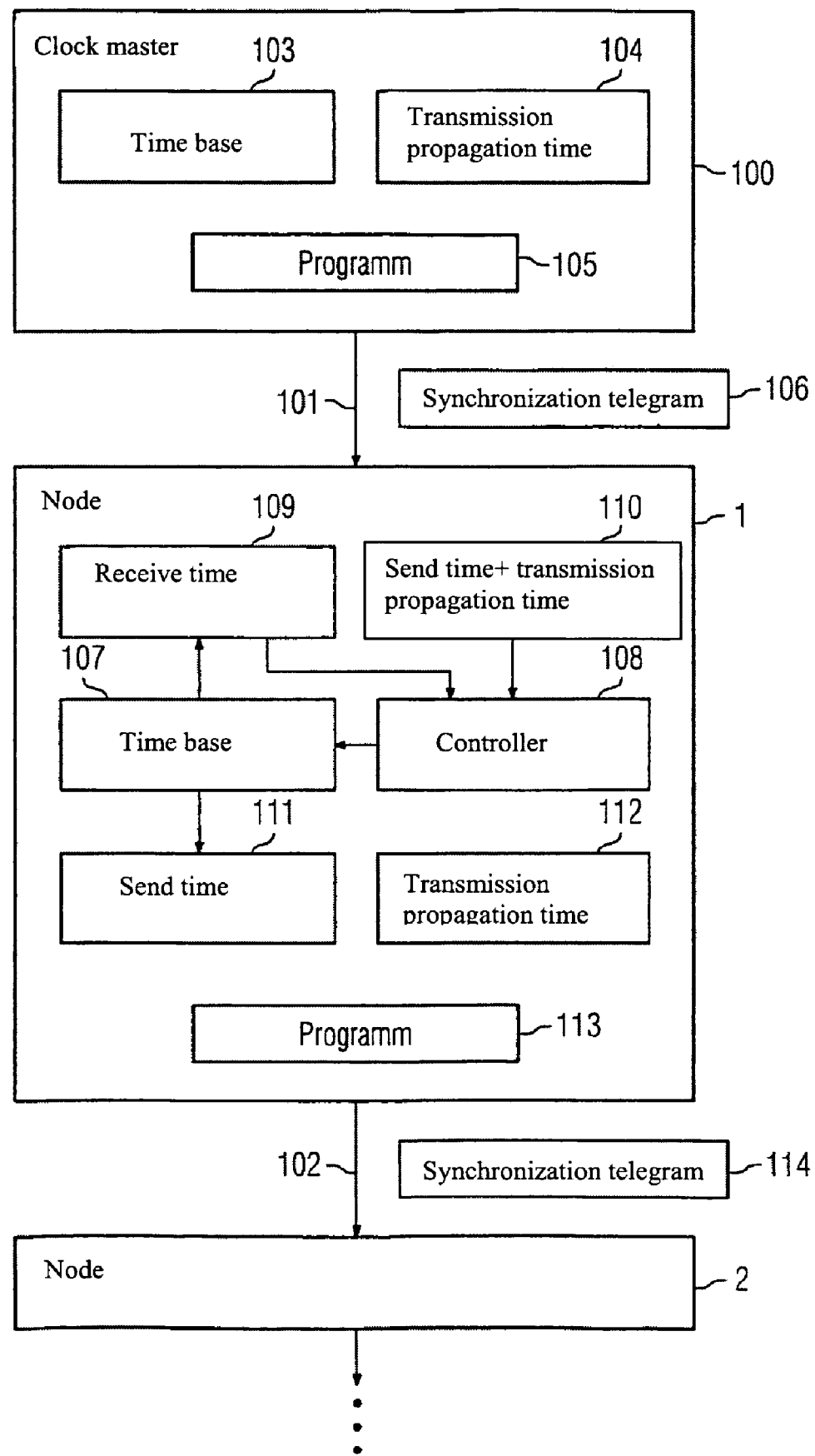
FIG. 2 is a block diagram of a clock master and a node.

FIG. 2 shows a block diagram corresponding to FIG. 1.

The clock master 100 has a master time base 103 and a memory 104 for storing the transmission propagation time $\Delta t_L$ via the line 101. Furthermore the clock master 100 has a program 105 which is used for the cyclical generation and transmission of synchronization telegrams 106. These synchronization telegrams each contain as useful data the relevant send time $t_0$ plus the transmission propagation time $\Delta t_L$.

The node 1 has a local time base 107 with a controller 108. The node 1 also has a memory 109 for storing the receive times of synchronization telegrams 106. Preferably the memory 109 is also used for storing the receive times of other data telegrams received by the node 1.

The node 1 also has a memory 110 for storing the reference receive time which has been received by means of a synchronization telegram 106.

The node 1 also has a memory 111 which is used for specifying send times of data telegrams and in particular also of synchronization telegrams 114 to the adjacent node 2. The transmission propagation time from the node 1 to the node 2 via the line 102 is stored in the memory 112.

The node 1 also has a program 113 which is used for generating and sending synchronization telegrams 114 to the node 2. Useful data contained in each of the synchronization telegrams 114 includes the reference receive time from the memory 110 plus the residence time plus the transmission propagation time from the memory 112. The residence time is produced here from the difference between the send time of the relevant synchronization telegram 114 and the receive time of the preceding synchronization telegram 106.

The mode 2 and further nodes (not shown in FIG. 2) of the communication system are in principle identical in structure to the node 1.

During operation of the communication system the clock master generates a synchronization telegram 106 which is received by the node 1. The actual receive time is stored in the memory 109; the reference receive time is read out from the synchronization telegram 106 and stored in the memory 110.

The time base 107 is adjusted by the controller 108 based on a deviation between the receive time and the reference receive time. By means of this correcting adjustment, agreement between the time base 107 and the master time base 103 is guaranteed within a tight tolerance range.

The program 113 then generates the synchronization telegram 114 which contains the reference receive time of the synchronization telegram 114 at the node 2 as useful data. The time base of the node 2 is also adjusted on this basis.

Figure 3:
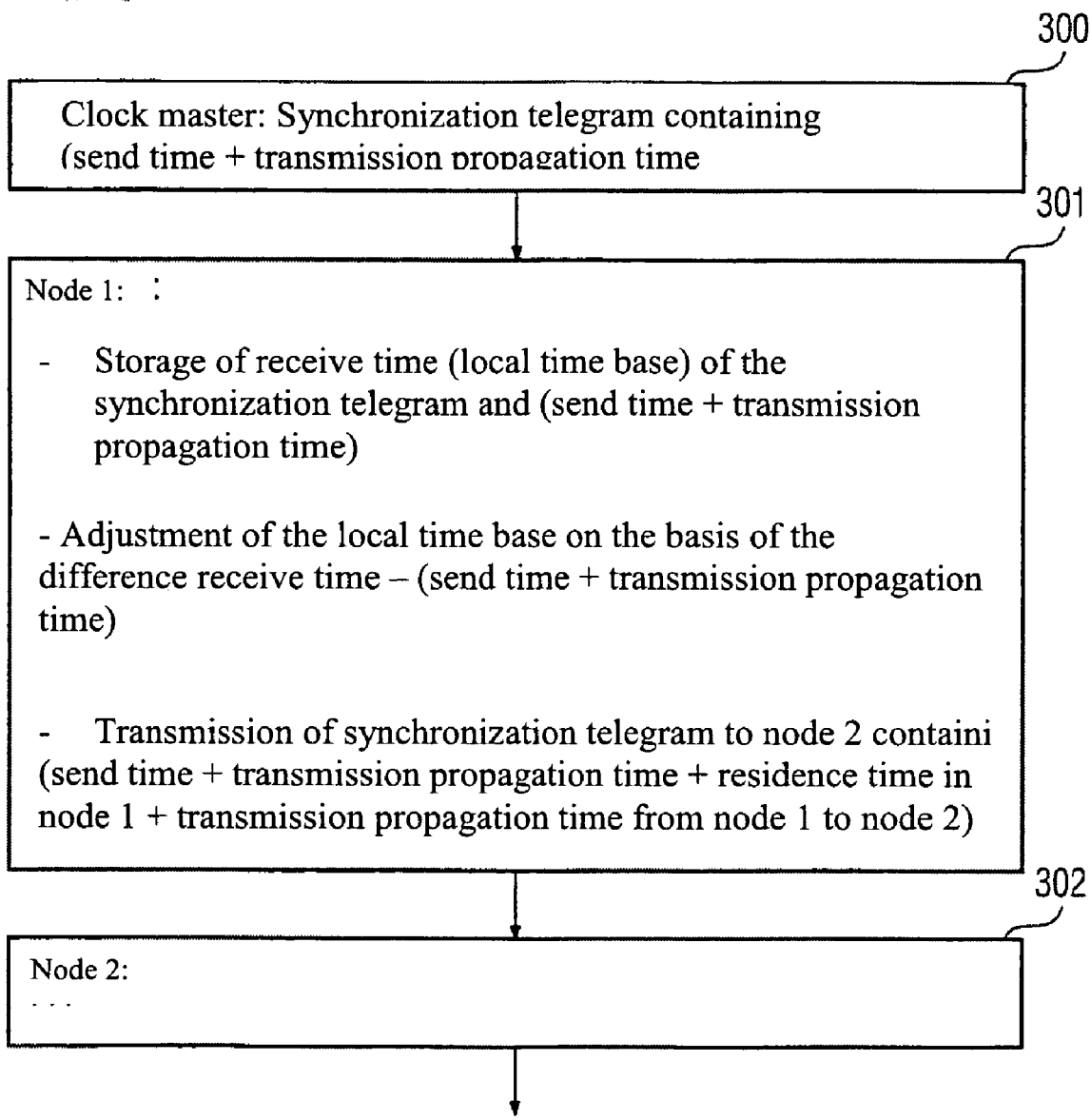
FIG. 3 is a flowchart for the synchronization of the local time bases.

FIG. 3 shows a corresponding flowchart. In step 300, the clock master sends a synchronization telegram containing the reference receive time of the synchronization telegram at an adjacent node 1 as useful data.

In step 301, the node 1 receives this synchronization telegram and determines the receive time for this synchronization telegram based on the local time base. This receive time is referred to as the actual receive time. The actual receive time and the reference receive time are stored by the node 1. A deviation between the actual and reference receive times is used as a basis for determining a correcting variable for adjusting the local time base in node 1 in order to bring this into synchronism with the master time base of the clock master.

The node 1 also generates and transmits a synchronization telegram for the node 2. This synchronization telegram contains its reference receive time at the node 2 as useful data.

In the node 2, an analogous procedure to that performed in the node 1 is used to adjust the local time base of the node 2 on the basis of the reception of this synchronization telegram from the node 1 and a further synchronization telegram for a following node 3 is generated and sent. This procedure is repeat ed in cascaded fashion until all successively connected nodes have been processed. Within, for example, predetermined time intervals, step 300 is executed again in order to perform this cascaded transmission and correction of the local time bases.

The procedure as shown in FIG. 4 can for example be followed in order to determine the transmission propagation time between two nodes. FIG. 4 shows how the transmission propagation time $\Delta t_L$ is determined over the line 102 between the nodes 1 and 2. In order to perform the propagation time measurement, the node 1 sends a propagation time measurement request telegram to the node 2. The data field of the propagation time measurement request telegram contains the send time $t_{Send-Req}$. The receiver, in other words node 2, stores the receive time $t_{Rec-Req}$ of the propagation time measurement request telegram at the node 2 and sends a propagation time measurement response telegram back to node 1 at time $t_{Send-Resp}$.

The following times are entered in the data field of this response telegram:

the send time $t_{Send-Req}$ of the request telegram from the initiator of the propagation time measurement, the delay time ($t_{Send-Resp}-t_{Rec-Req}$) between request and response telegram.

The node 1 of the propagation time measurement stores the arrival time of the propagation time measurement response telegram $t_{Rec-Resp}$ and determines the transmission propagation time with the aid of the formula:

$$\text{transmission propagation time}:=[(t_{Rec-Resp}-t_{Send-Req})-(t_{Send-Resp}-t_{Rec-Req})]/2$$

In other words, the transmission propagation time $\Delta t_L$ is determined based on the total time required for performing the propagation time measurement minus the residence time in the node 2. The propagation time for forward and reverse path is assumed to be equal for the purpose of the calculation, i.e. forward and reverse line must be the same length.

This procedure can be initiated for example on the basis of the program 113 in the node 1 (cf. FIG. 2). The transmission propagation time $\Delta t_L$ determined in this way is then entered in the memory 112 by the program 113.

The invention claimed is:

1. A method for synchronizing nodes of a communication system, comprising:

receiving a first synchronization telegram by a first node, the first synchronization telegram containing a reference receive time at the first node;

adjusting a time base of the first node based on a deviation between an actual receive time based upon the time base and the first reference receive time;

transmitting a second synchronization telegram from the first node to an adjacent second node, the second synchronization telegram containing a second reference receive time at the second node, the second reference receive time comprising a residence time from a send time of the second synchronization telegram and a receive time of the first synchronization telegram; and adding the residence time and a transmission propagation time between the first node and the second node to the first reference receive time at the first node in order to determine the second reference receive time.

2. The method according to claim 1, wherein the first synchronization telegram is generated by a clock master having a master time base, so the reference receive time at the first node is determined from the send time of the first synchronization telegram generated by the clock master.

3. A computer readable medium encoded with a computer program, comprising:

program executable instructions for adjusting the time base of a first node of a communication system based on the reception of a first synchronization telegram by the first node;

a first reference receive time contained within the synchronization telegram at the first node, the adjustment of the time base of the first node performed based on a deviation between an actual receive time of the first synchronization telegram determined on the basis of the time base and the reference receive time at the first node;

a second synchronization telegram generated by the program; and a second reference receive time contained within the second synchronization telegram at the second node and determined by a residence time and a transmission propagation time, the residence time determined in the first node from the send time of the second synchronization telegram and the receive time of the first synchronization telegram, the transmission propagation time added between the first node and the second node to the first reference receive time at the first node.

4. The computer readable medium according to claim 3, wherein the program determines the transmission propagation time between the first and the second node.

5. The computer readable-medium according to claim 3, wherein the digital storage medium is selected from the group consisting of: a floppy disk, a CD-ROM, semiconductor memory, and combinations thereof.

6. A node for an isochronous communication system, comprising:
a time base;
a control element for adjusting the time base;
a deviation between an actual receive time of a first synchronization telegram determined on the basis of the time base and the first reference receive time contained in the first synchronization telegram at the first node;
an adjustment of the time base is performed based on the deviation; and
a second synchronization telegram generated for a second node by the control element, the second synchronization telegram containing a second reference receive time at the second node, the second reference receive time determined by a residence time and a transmission propagation time, the residence time determined from the difference between the send time of the second synchronization telegram and the receive time of the first synchronization telegram, the transmission propagation time added between the first and the second node to the first reference receive time at the first node.

7. The node according to claim 6, wherein the node determines the transmission propagation time between the node and an adjacent second node.

8. A communication system, comprising:
at least one clock master having a master time base;
a means for sending a first synchronization telegram to an adjacent first node of the communication system;
a reference receive time contained in the first synchronization telegram at the first node, the reference receive time is determined from the send time of the first synchronization telegram from the clock master and the transmission propagation time between the clock master and the first node; and
a plurality of nodes, comprising:
a time base;
a control element for adjusting the time base;
a deviation between an actual receive time of a first synchronization telegram determined on the basis of the time base and the first reference receive time contained in the first synchronization telegram at the first node;
an adjustment of the time base is performed based on the deviation; and
a second synchronization telegram generated for a second node by the control element, the second synchronization telegram containing a second reference receive time at the second node, the second reference receive time determined by a residence time and a transmission propagation time, the residence time determined from the difference between the send time of the second synchronization telegram and the receive time of the first synchronization telegram, the transmission propagation time added between the first and the second node to the first reference receive time at the first node.

9. The communication system according to claim 8, wherein the communication system determines the transmission propagation time between the first node and an adjacent second node.

10. The communication system according to claim 9, wherein the communication system contains a plurality of nodes.

11. The communication system according to claim 8, wherein the communication system has at least one clock master and a plurality of nodes.

12. A node for an isochronous communication system, comprising:
a time base; and
a control element for adjusting the time base, the control element designed such that the adjustment of the time base is performed based on a deviation between an actual receive time of a first synchronization telegram determined on the basis of the time base and the reference receive time contained in the synchronization telegram at the node.

13. The node according to claim 12, wherein the node generates a second synchronization telegram for a second node, the second synchronization telegram containing a reference receive time at the second node, the reference receive time at the second node determined by determining a residence time from the difference between the send time of the second synchronization telegram and the receive time of the first synchronization telegram, and the transmission propagation time added between the first and the second node, and the reference receive time added at the first node.

14. The node according to claim 12, wherein the transmission propagation time between the node and an adjacent second node is determined at the node.

* * * * *